DIMITRI SENSAUD DE LAVAUD.
TOPOGRAPHICAL RECORDER.
APPLICATION FILED JAN. 3, 1919.

1,401,242.

Patented Dec. 27, 1921.
4 SHEETS—SHEET 1.

Fig. 1.

INVENTOR
Dimitri Sensaud de Lavaud
BY
Augustus M. Henry
ATTORNEY

UNITED STATES PATENT OFFICE.

DIMITRI SENSAUD DE LAVAUD, OF NEW YORK, N. Y.

TOPOGRAPHICAL RECORDER.

1,401,242.  Specification of Letters Patent.  Patented Dec. 27, 1921.

Application filed January 3, 1919. Serial No. 269,513.

*To all whom it may concern:*

Be it known that I, DIMITRI SENSAUD DE LAVAUD, a citizen of the United States of Brazil, and a resident of New York, in the county of New York and State of New York, have invented certain new and useful Improvements in Topographical Recorders, of which the following is a specification.

This invention relates to automatic portable surveying apparatus of the cable and reel operated type. More particularly the invention relates to apparatus of this kind wherein a permanent graphic record of the course surveyed is made as the result of the provision of elevation measuring means, true-distance measuring means, horizontal-distance measuring means operated by the first two means acting in conjunction, and azimuth measuring means.

An important object of the invention is to provide a combination of such means whereby the invention may be simply and practically embodied in a very small, compact and light instrument which may be borne entirely out of contact with the ground by a single porter marching alone, if necessary, through a tract to be surveyed having dense vegetation.

By "true-distance" is meant the actual linear distance of the course surveyed as the course ascends and descends following the profile of the land. Now, the majority of previous surveying instruments of the kind above described have relied on ground wheels for controlling the operation of the true-distance measuring means, but the action of such ground wheels has been unreliable so far as accurate measurements are concerned, and the use of such wheels has really been impracticable where tracts having dense vegetation have had to be surveyed. Consequently, the reel and cable method of actuating the true-distance measuring means has been sought to be used in some instances.

In none of these previous constructions, however, so far as I am aware, has the reel and cable means been used for actuating the elevation measuring means so as to cause the latter to co-act with the true-distance measuring means also operated by the same reel and cable means, for the purpose of actuating the horizontal-distance measuring means to function to give accurate elevation corrections. These ends are attained by the present invention. According to one previous construction, the cable after passing from the reel is drawn along an arm offset from a rotatably mounted plate forming a part of the recording means and carrying fixed thereon a sheet of paper for coacting with a stylus or marker, traveling up and down over the paper in accordance with the movement of the distance measuring means; so that with the cable withdrawn at an upward or downward angle to the instrument as when the part of the course being surveyed is a declivity, the arm alines itself with the withdrawn cable and swings the plate about its pivot. But in such a construction it is obvious that as the stylus is more or less above the point of pivotal mounting of the plate, the correction of the elevation measuring arm is of greater or lesser value relative to the actual correction which should be made. A feature of the present invention is the employment of the cable and reel for actuating an elevation measuring means of the pivoted arm type controlled by the angle of unwinding of the cable, as heretofore, but the invention provides novel means whereby such actuation and control transmits itself accurately to the recording means, This result is attained by providing other than a rigid connection between the elevation measuring means and the recording means, in such a way that as the arm rocks to exhibit elevation measurements, such rocking is received at the recording means through an additional member impositively engaging the record sheet for shifting the same. Also, in the case of a "map-making" recording means, rocking of the arm is further indirectly transmitted to the recording means by being preliminarily applied to operate one member of a variable gearing, another member of the variable gearing being operated by the true-distance measuring means, whereby horizontal-distance measurements are exhibited by third member of the variable gearing for transmission to the "map-making" recording means; the three members of the variable gearing being always directly engaged. This variable gearing preferably includes a friction sphere on a vertical axis—rotated at a rate of speed corresponding to the rate of withdrawal of the cable, said axis thus constituting the true distance measuring means— and a friction wheel mounted on the arm and so disposed as to be rotated by the sphere at maximum speed when the arm is horizontal and the wheel is in contact with the equator of the sphere, and to be rotated at lesser speeds when the arm is inclined up or down and the wheel is in contact with smaller circles of the sphere parallel to the equator. An important feature of the present invention, therefore, is the provision of a novel variable gearing between the reel and cable, on the one hand, and suitable recording means, on the other, which includes as directly engaged parts thereof an elevation measuring means, a part (the sphere) fast on the true-distance measuring means, and a horizontal-distance measuring means, and in which gearing the elevation measuring means operates independently of gravity and there is thus avoided the employment of the familiar pendulum device which is unsatisfactory in many respects and particularly in requiring that the instrument be precisely level at all times.

An important feature of the invention is the provision of a recording means for giving the line record of the course surveyed in correct datum-line values and with all changes of direction shown, including a fixed marker, a slidably and rotatably mounted drum for carrying a record sheet wound thereon, and a driving means for the slidable and rotatable drum comprising a single friction wheel rotatable about its axis and about a diameter thereof simultaneously. The arrangement is such that the azimuth measuring means controls the rotation of the friction wheel about its diameter and the distance measuring means controls the rotation of the friction wheel about its axis, so that, for the first time in surveying instruments of the kind described, such a single friction wheel, mounted for the two rotational movements described, may act upon a rotatable and slidable drum to cause the same, while having sliding movements along its axis, to have reverse as well as forward turning movements about its axis. In one previous arrangement, such a single friction wheel mounted for said two rotational movements has been provided to operate a rotatable and slidable record carrying drum, but the drum has been one of a pair of drums and acted on by the friction wheel to wind a tape or the like thereon as such tape is unwound from the other drum. According to this arrangement, however, the drum acted on by the friction wheel has not been capable of rotation in the reverse as well as in the forward direction, due to the fact that the rotation of the wheel about its diameter has been effected by a pendulous weight acting as an elevation measuring means, the angle of swing of the pendulous weight never exceeding 90° and hence, of course, never having a sufficient magnitude to rotate the wheel about a diameter thereof to a sufficient extent to permit rotation of the wheel about its axis to reverse the direction of rotation of the take-up drum. In another previous arrangement, such a friction wheel has been mounted for rotation about its axis and also about a diameter thereof, for contacting a record sheet and moving such sheet to give a datum-line map in the shape of a closed figure inscribed thereon by means of a fixed stylus. In this instrument, an azimuth measuring means, operated by a link connection to the steering wheel of a tricycle constituting the supporting and transporting vehicle for the instrument, has effected rotation of the friction wheel about its axis, while a true-distance measuring means, in part operated by a connection to one of the wheels of the tricycle, has effected rotation of the friction wheel about a diameter thereof. According to this construction, however, the record sheet has been arranged in a single plane and variously shifted about in this plane by the action of the friction wheel, to secure a record; an obviously impracticable arrangement due to the fact that if the map is to be inscribed on a single sheet, as is preferable, if not necessary for obtaining reliable results, the surveying instrument must be made so large, especially as regards width and length, as to prevent convenient portage through tracts having dense vegetation.

Another important feature of the invention is the provision of a simple, convenient and novel arrangement for giving manual control of the azimuth measuring means, including a compass fixed on the surveying instrument and a rotatable card of smaller diameter than the compass card mounted above the same and preferably concentric therewith and preferably having marked on its margin azimuth degrees to correspond with similar degrees marked on the compass card margin, in combination with a hand actuator for rotating the rotatable card to cause its marginal marks to register with the marks on the compass card, thereby to set the azimuth measuring means and the recording means in agreement with the situation, whenever the instrument changes direction as the direction of the course is changed, and relative movement occurs between the two cards.

Another feature of the invention is the provision of operative connections between the various measuring means and recording means present, which are entirely mechanical, and therefore positive and accurate in action and not dependent on battery and contact-life as is otherwise disadvantageous in reconnoissance instruments. These mechanical connections may include a worm and worm-gear map-scale control of novel arrangement, permitting instantaneous and economical rearrangement of the instrument in this particular.

Preferably the invention is carried out by providing a surveying instrument of the kind described having a plurality of recording means, both constructed as above explained, that is, including a fixed marker, a slidable and rotatable drum for carrying a record sheet, and a driving means for the drum comprising a single friction wheel rotatable about its axis and about a diameter thereof simultaneously; the first or the "map-making" recording means operating to give a line record of the course surveyed in correct datum-line values and with all changes of direction shown and being operated by the horizontal-distance measuring means and the azimuth measuring means acting in conjunction, and the second or "profile-making" recording means operating to give a profile record showing ascents and descents relative to an actual or imaginary straight line representation of the entire horizontal-distance measurement, and being operated by the true-distance measuring means and the elevation measuring means acting in conjunction; the two records being made simultaneously and, by common actuators, to secure an absolutely complete and entirely accurate geographical record of the area surveyed.

Another feature of the invention, making for friction reduction, simplicity and reliability, is the disposition of the drum of the second or profile-making recording means and the drum's friction wheel so that the diameter of the friction wheel about which the wheel is rotated, when the elevation measuring means is imposing control, is the diameter of the wheel then horizontal and alined with the axis of the arm constituting the elevation measuring means. According to this disposition of the parts, the friction wheel mounting, which is of course rotatable to permit the friction wheel to be rotated about a diameter as explained, is rigidly connected to said arm in such a way that the arm and mounting turn as one unit.

Another feature of the invention is a construction of the instrument such that it includes two separable supports, with various working parts of the instrument on the two supports, and particularly with the elevation measuring means on one support and the azimuth measuring means on the second support, so that at will the instrument may be attached to a body harness for a single porter, with the first support in rear of the porter's body and the second support in front of him (means being preferably provided whereby the second support may be freely suspended in front of the porter), or both supports may be disconnected from the harness and one support superposed in fixed relation on the other. According to this arrangement, the same instrument may be used at will for surveying by unwinding the cable during portage of the instrument or for surveying by unwinding the cable when the entire instrument is mounted on a tripod or the like.

Very many other objects and advantages of the invention will be seen, and the invention itself will be more fully understood, from the following description of an illustrative embodiment at present preferred, when taken in connection with the accompanying drawings, of which—

Similar reference characters refer to similar parts throughout the several views of the drawings.

Figure 1:
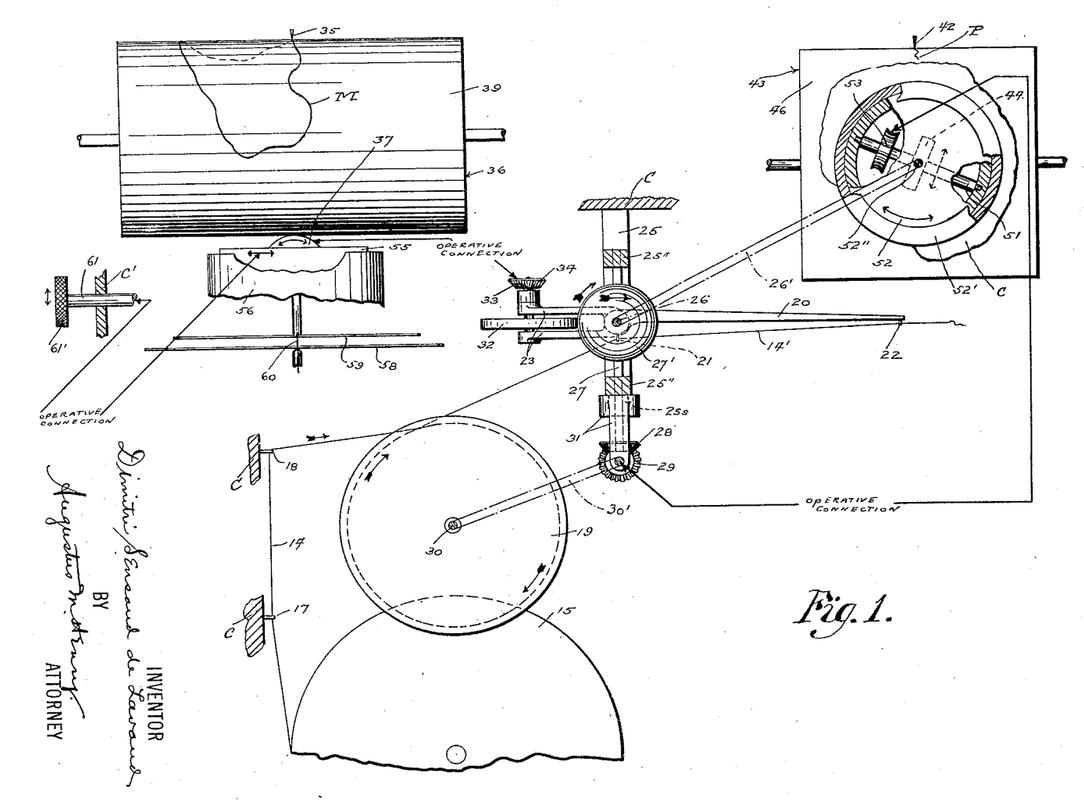
Figure 1 is a schematic view showing the main working parts of the instrument, certain operative connections being merely indicated.

Attention is first directed to Fig. 1, which, being diagrammatic, shows the main working parts in non-overlapping relation wherever practicable, to give greater clearness, this end being attained by throwing to the right the part of a shaft 30 beyond a wheel 19, as indicated in dot-and-dash lines at 30', and by throwing also to the right the part of a shaft 26 beyond a frame 25, as indicated in dot-and-dash lines at 26'.

A cable 14 is withdrawn from the instrument by being unwound from a reel 15; the cable thence passing around a horizontal rod 17 and through an eye 18, both fixed to a part of the supporting means or casing C, and thence passing around grooved wheel 19.

The elevation measuring means is constituted by a movable arm 20, the arm being fast on a stud shaft 26 journaled in frame 25 fixed on casing C. As the cable is withdrawn in surveying a distance from one point to another point at a different elevation, the length 14' of the cable rocks the arm and causes the arm to extend along a straight line joining the two points. The true-distance measuring means is constituted by a vertical shaft 27, journaled in a fork 31 fixed to frame 25; an intermediate portion of the shaft turning in a sleeve 25$^s$ dependent from frame 25. The true-distance measuring means is operated in agreement with the rate of unwinding of the cable 14, a bevel gear 28 fast on the shaft 27 meshing with a bevel gear 29 fast on the same shaft 30 on which grooved wheel 19 is fixed.

The horizontal-distance measuring means is constituted by a friction wheel 32, pivotally carried as shown on a shelf 23 forming a bifurcated rear extension of arm 20, so as to be driven in each of various inclined positions of the arm 20, by contact with a driving sphere 27' fixed on vertical shaft 27 between cross-pieces 25'' of frame 25. Such a spherical friction drive, for obtaining the proper cosine corrections relative to the true-distance measurements, thereby to obtain corresponding horizontal-distance measurements, is old in the art, and is not claimed *per se*, but only in the particular combinations defined in the appended claims.

The map-making recording means is shown at the top left of Fig. 1 and includes a fixed stylus 35, a rotatable and slidable drum 36 and a friction wheel 37 rotatable about its axis, which axis is always horizontal, and also about the diameter thereof which at any instant happens to be vertical, thereby to give the drum rotatable, sliding or combined rotatable and sliding movements relative to the stylus.

The profile-making recording means is shown at the top right of Fig. 1 and includes a fixed stylus 42, a rotatable and slidable drum 43 and a friction wheel 44, mounted for rotation about its axis and also about a diameter thereof, thereby to give the drum 43 rotational, sliding or combined rotational and slidable movements relative to the stylus.

Provision is made for rotating the friction wheel 44 about its axis, by fixing the friction wheel on a rotatable shaft 51 journaled in opposite portions to the side wall of a cylindrical device 52. This shaft 51 has fixed thereon a worm gear 53; and an operative connection, preferably mechanical is provided between the worm gear 53 and the shaft 30 as indicated. Provision is further made for rotating the device 52 about an axis perpendicular to the shaft 51, thereby to rotate the friction wheel 44 about a diameter thereof while the wheel is rotating about its own axis, by loosely mounting the device in a cylindrical bearing 52' fixed to a part of casing C.

In order to provide likewise for rotating friction wheel 37 about its axis and about a diameter simultaneously, the wheel is similarly mounted on a shaft (not shown) similar to the shaft 51 and journaled in a cylindrical device 55 similar to the device 52, and like the latter, loosely mounted in a fixed cylindrical bearing 56. The latter bearing, however, is carried by casing C'.

The azimuth measuring means, provided in connection with a card 58 of a suitable compass, comprises a rotatable card 59 fixed below and concentric with the device 55 of the map-making recording means, the rotatable card being also concentric with but above the compass card 58. The rotatable card is marked on its upper marginal surface in azimuth degrees to agree with the marks on the upper marginal surface of the compass card. A lubber's line 60 is arranged so as to form a common index for bringing the two cards into registry. A knob 61' is fixed on a shaft 61 rotating in a fixed bearing on casing C', and operatively connected to the device 55 as indicated, so as to rotate the latter and the card 59 as one unit, to bring the two cards into registry; this knob constituting a hand actuator for rotating the device 55 through the same number of degrees as the number of degrees through which card 59 must be rotated to bring the two cards into registry.

The parts just described are arranged so as to have the friction wheel 37 always disposed in a plane parallel to the axis of the drum 36 when the lubber's line intersects the diameter 90—270 of the two cards and so as to have the friction wheel always disposed in a plane perpendicular to the axis of the drum when the lubber's line intersects the diameter 0(360)—180 of the two cards.

If now the friction wheel 37 is rotated about its axis at a rate of speed bearing a fixed relation to that of friction wheel 32 (the horizontal-distance measuring means), a graphic planimetric map M of the area surveyed will be inscribed by the fixed stylus 35 on the record sheet on drum 36, due to relative movements between the sheet and the stylus pursuant to the various motions of the friction wheel 37. In order thus to provide for rotating the friction wheel 37 about its axis, a shaft 33 on which the friction wheel 32 is fast has fixed thereon a bevel gear 34, and an operative connection, as indicated, is provided between the gear 34 and friction wheel 37. It will be seen that rocking of the arm 20 is indirectly transmitted to the map-making recording means by being preliminarily applied to operate one member (the shelf 23) of the variable gearing, another member (the sphere 27') of the variable gearing being operated by the true-distance measuring means (the shaft 27), whereby horizontal-distance measurements are exhibited by the third member of the gearing (wheel 32) for transmission to the map-making recording means; the three members of the variable gearing being always directly engaged.

The map-making recording means is thus operated through the two operative connections indicated, both functioning simultaneously when required, one leading from the direction setting means including the card 59, through the device 55 to friction wheel 37, and the other leading from the horizontal distance measuring means (the friction wheel 32) independently of angular movement of the device 55, to the friction wheel 37—the friction wheel 37 merely impositively engaging the record sheet of the drum.

The profile-making recording means is similarly operated through two connections as indicated, one connection leading from the true-distance measuring means (the shaft 27) that is, from the shaft 30 which is rotating at the same speed as the shaft 27 due to the fact that the bevel gears 28 and 30 have the same number of teeth, to the worm gear 53 fixed on the shaft 51 carrying friction wheel 44; the other connection being provided by mounting the arm 20 and the device 52 coaxially, the device 52 having a central stem 52'' rigidly connected to a shaft 26 offset from arm 20, as indicated at 26'. The parts just described are arranged so as to have the friction wheel 44 always disposed in a plane perpendicular to the axis of drum 42 when the arm 20 is horizontal, whereby the friction wheel will take positions in planes properly inclined out of the perpendicular relative to the axis of the drum, to give a correct profile record as indicated at P. The profile-making recording means is thus actuated through the two operative connections indicated with both functioning simultaneously when required (and simultaneously with the two operative connections for the map-making recording means when required);—the friction wheel 44 merely impositively engaging the record sheet on the drum.

Figure 2:
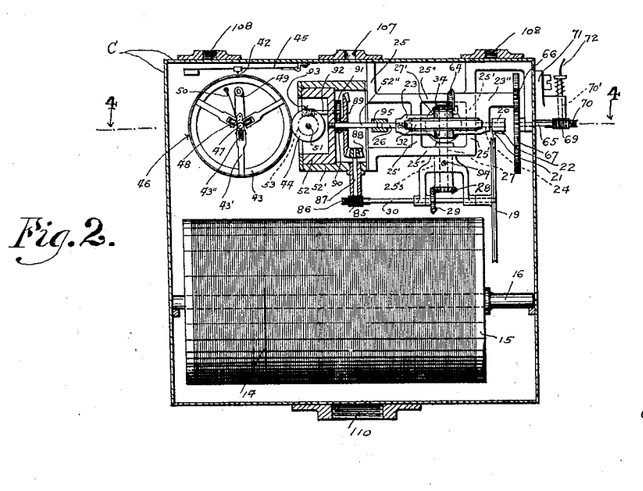
Fig. 2 is a rear elevation of the supporting means or casing carrying the elevation measuring means, and of its contents, with the near wall of the casing removed.
Figure 3:
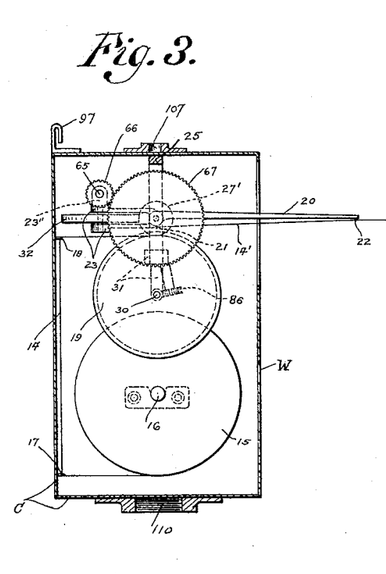
Fig. 3 is a similar end elevation thereof, looking toward the left of Fig. 2.
Figure 4:
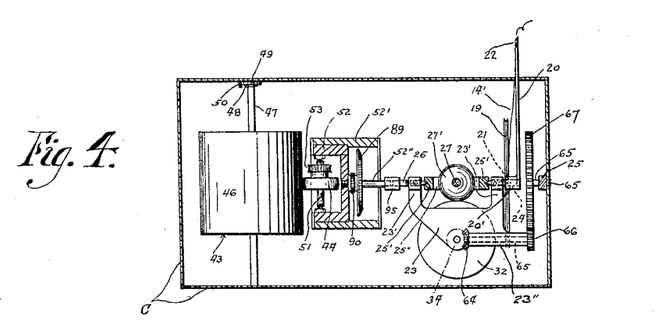
Fig. 4 is a fragmentary plan view taken on the line 4—4 of Fig. 2.

Referring now to Figs. 2, 3 and 4, the structural details of the casing C and its carried parts are shown.

The cable-carrying reel 15 is hung loosely on a shaft 16; cable 14 passing around rod 17 and through eye 18 and thence once around grooved wheel 19. The length 14' of the cable engages arm 20 in the plane of the grooved wheel by being passed through eye 21, located in said plane, on the under side of the hub portion 20' (Fig. 4) of the arm; and in order that the arm may be moved down to be closed within the casing C when the casing's removable wall W is closed, said hub portion 20' is prolonged away from the plane of the grooved wheel to dispose the main part of the arm 20 out of said plane, the length 14' of the cable being slightly obliquely disposed as shown in Fig. 4, so that after leaving eye 21 such length passes through and beyond eye 22 on the free end of the arm. Arm 20 is practically integral with a pivotally mounted shelf 23, the arm (as shown best in Fig. 4) being pinned on a pivoted stud 24 screwed tight into one horn 23' of the shelf and having a protruded cone point seated in a conical recess in one of the upright pieces 25' of frame 25; the other horn of the shelf being similarly pivotally mounted on the frame by a similar stud 26.

The true-distance measuring shaft 27 has secured thereon the sphere 27', is journaled in cross-pieces 25'' of frame 25 and is operated through the bevel gear 28 fixed thereon and meshing with the similar gear 29 fixed on the horizontal shaft 30 on which is secured grooved wheel 19, the shaft 30 being journaled in the fork 31 secured on the sleeve 25$^s$; all as described in connection with Fig. 1.

The horizontal-distance measuring friction wheel 32 is pivotally mounted on the shelf 23 by being fixed on the lower portion of the vertical shaft 33 having fixed thereon at its top the bevel gear 34.

Figures 5, 6, 7, 8:
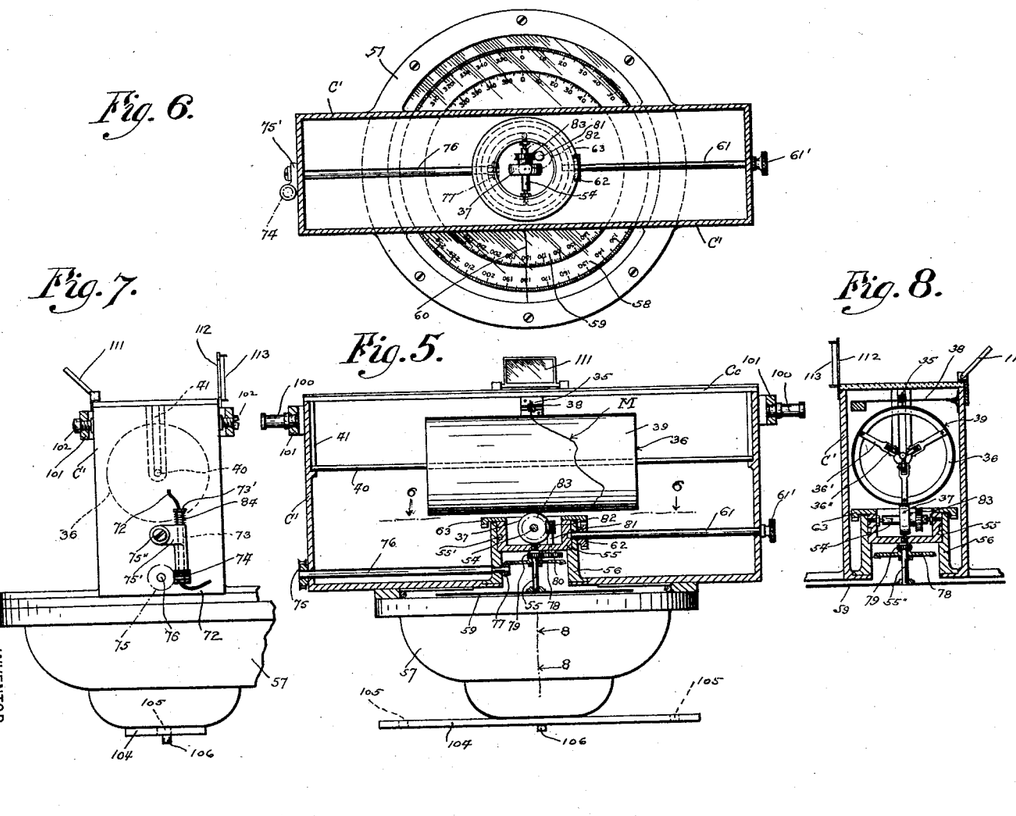
Fig. 5 is a vertical section taken through the supporting means or casing carrying the azimuth measuring means, the compass box and certain other parts being shown in elevation.
Fig. 6 is a horizontal section taken on line 6—6 of Fig. 5.
Fig. 7 is a side elevation of the parts shown in Fig. 5.
Fig. 8 is a vertical section taken on line 8—8 of Fig. 5.

As shown in Figs. 5, 6, 7 and 8, the map-making recording means includes the fixed stylus 35, the drum 36 and the friction wheel 37, all as explained in connection with Fig. 1. The stylus 35 is secured on a weighted pivotally mounted leaf member 38, so as to rest its point by gravity on the record sheet 39 on the drum. The drum is rotatable and slidable on a shaft 40, resting, during operation of the apparatus, in the the bottoms of two vertical open-top grooves 41 formed in the side walls of casing C'; and in order that access may be had to the interior of the casing, to readjust the drum on the shaft to secure separate records in addition to the record M already inscribed, or to remove the shaft 40 on drum 36 for changing the record sheet on the drum, the top of the casing is formed, preferably of glass to permit inspection of the map-making recording means during its operation, as an easily removable cover plate C$^c$. Drum 36 is mounted on shaft 40 as shown in Fig. 8, the drum having at each end three equidistant radially arranged arms 36′ carrying shaft-contacting wheels 36″.

Adverting to Figs. 2, 3 and 4, the profile-making recording means includes the stylus 42, the drum 43 and the friction wheel 44; all as described in connection with claim 1. Stylus 42 is secured on a weighted pivotally mounted leaf member 45, so as to rest its point by gravity on record sheet 46 on drum 43. Drum 43 is rotatable and slidable on a shaft 47, as shown in Fig. 2, the drum having at each end three equidistant radially arranged arms 43′ carrying shaft contacting wheels 43″.

In order to hold the record sheet 46 against friction wheel 44, and to permit ready removal or readjustment of the drum, the following construction is provided. The shaft at its near end in Fig. 2 is free and its far end carries an elongated head 48 secured to a depending lever 49 urged to swing toward the friction wheel 44 by a leaf spring 50.

The rotatable shaft 51 carrying the friction wheel 44, the cylindrical device 52 journaling such shaft, and the fixed bearing 52′ for the device whereby the friction wheel 44 is rotatable about its axis and also about a diameter thereof, are all structurally shown in Fig. 2.

The means likewise for rotating the friction wheel 37 about its axis and also about a diameter thereof, to wit, a rotatable shaft 54 carrying the friction wheel, the cylindrical device 55 journaling the shaft, the fixed bearing 56 for the device, are all structurally shown in Figs. 5, 6 and 8.

Also shown in Figs. 5, 6 and 8 are a compass 57 having a card 58; the rotatable card 59, secured at its center to the lower end of a central depending stem 55″ of the device 55, constituting the azimuth measuring means. A lubber's line 60 is provided so that the marginal degrees on the two cards may be easily brought into registry. The direction-setting means comprises the knob 61′ (constituting the hand actuator of the direction setting means) fixed on shaft 61 journaled in one of the end walls of casing C and also in bearing 56. The inner end of shaft 61 is reduced and is seated in an annular groove 55′ formed as shown on the device 55. The operative connection between shaft 61 and device 55, whereby the latter may be rotated by the knob to the extent required to put the two cards into registry includes a spur gear 62 meshing with a crown gear 63 secured on top of device 55, these two gears being preferably incompletely meshed, as shown most clearly in Fig. 1, to afford easy and sufficiently accurate engagement.

Referring to Figs. 2–8, the operative connection between the device 55 (Fig. 5) and the bevel gear 34 (Fig. 3) rotating with the horizontal-distance measuring means (the friction wheel 32), includes a bevel gear 64 meshing with gear 34 and fixed on a shaft 65 journaled in a bearing boss on shelf 23; a "walking" spur gear 66 fixed on said shaft 65 and meshing with a "sun" spur gear 67 fixed on a shaft 68 journaled in the end wall of casing C; a worm 69 fixed on shaft 68 and meshing with a worm gear 70 keyed on a shaft 70′ journaled in a bracket 71 on casing C; a flexible shaft 72 leading from shaft 70′ and thence going to the mechanism of Figs. 5, 6 and 7 by being secured to a shaft 73 carrying fixed thereon a worm 74, the shaft 73 being journaled in a bracket 75′ on casing C′; a worm gear 75 meshing with worm 74 and fixed on one end of a shaft 76, the shaft being journaled adjacent to the gear 75 in the end wall of the casing C′ and having a reduced portion at its inner end journaled in fixed bearing 56 and carrying fixed thereon a bevel gear 77; a bevel gear 78 meshing with gear 77 and loose on stem 55″; a spur gear 79 also loose on the stem but fixed to the gear 77; a spur gear 80 meshing with the gear 79 and fixed on the lower end of a vertical shaft 81 journaled in the bottom wall of device 55; a worm 82 fixed on the upper end of shaft 81; and a worm-wheel 83 meshing with worm 82 and fast on the shaft 54 carrying friction wheel 37. At least one of the worm gear sets 67—70 and 74—75, but preferably both, are constructed as shown in order to permit the map-scale to be changed at will, and by the mere substitution for either or both the worm gears 70 and 75 other worm gears of different ratios but of the same pitch as the worms 69 and 74; the bracket 75′ of Fig. 7 being pivotally mounted at 75″ and the shaft 73 being axially movable in the bracket against the tendency of a coil spring 84 restrained between the bracket and a cap 73′ on shaft 73. The bracket 71 on casing C is similarly constructed.

Referring now to the profile recording means of Figs. 2, 3 and 4, the operative connection from (a) the shaft 30, rotated by grooved wheel 19 at the same speed as the shaft 27 (the true-distance measuring means) due to the presence of the bevel gears 28 and 29, to (b) the worm gear 53 fast on shaft 51 carrying friction wheel 44, includes the following parts: A worm 85 is fast on shaft 30 and meshes with a worm gear 86 fast on a shaft 87 having a reduced end portion journaled in bearing 53 and carrying fixed thereon a bevel gear 88. The bevel gear 88 meshes with a bevel gear 89 loose on a stem 52″ fixed centrally to device 52. A spur gear 90 is fast on the hub portion of the gear 89 and meshes with another spur gear 91 fixed on one end of a shaft 92 journaled in the bottom wall of device 52. Fast on the other end of shaft 92 is a worm 93 meshing with worm gear 53.

In order that the map-scale of the profile-making recording means may be varied to correspond with a change in the map-scale of the map-making recording means, by the use of suitable worm gears (not shown) interchangeable with worm gear 86 on shaft 87, while retaining worm 55, the fork 31, in which the shaft 30 is journaled, is adjustable angularly on sleeve 25$^s$ and clamped in any required adjustment by a set screw 94.

The operative connection from (a) the shelf 23 (fixed to the elevation measuring means—the arm 20) to (b) the device 52, for angularly adjusting the latter to rotate the friction wheel 44 about a diameter while the friction wheel is rotating about its axis, includes the following arrangement (Fig. 2): The central stem 52" on device 52 is alined with the stud shaft 26 fixed to shelf 23 and such stem and shaft are clamped together for rotation as one unit by a coupling 95.

*Operation.*

Upon withdrawing cable 14, grooved wheel 19 is rotated, and thereby the shaft 27 and the friction wheel 32 are simultaneously rotated, the first to act as a true-distance measuring means, and the second to act as a horizontal-distance measuring means due to the cosine correction of the sphere 27' as such correction is regulated by the angle of the arm 20 from the horizontal, which angle is controlled also by the withdrawal of the cable. While the true-distance measuring means, through the connections described is rotating friction wheel 27 of the map-making recording means of Fig. 5 about its axis, the horizontal-distance measuring means, through the connections described, is rotating the friction wheel 44 of the profile-making recording means of Fig. 2 about its axis; and, simultaneously, the elevation measuring means, through the connections described, is rendering complete the operation of the profile-making recording means by rotating the friction wheel 44 about a diameter thereof, while the azimuth measuring means, constituted by the compass card 58 of Fig. 6, is automatically functioning to permit manual control of the rotatable card 59 of the direction setting means, through use of the hand actuator or knob 61', so as to render complete the operation of the map-making recording means.

Figure 9:
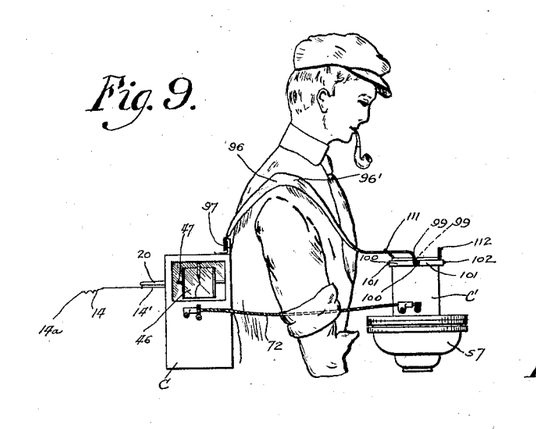
Fig. 9 is a side elevation showing the two casings on a body harness arranged on a single porter so that the casing of Figs. 5—8 is in front of the porter and the casing of Figs. 2-4 is in back of the porter, for surveying by unwinding the cable during portage of the instrument.
Figures 10, 12:
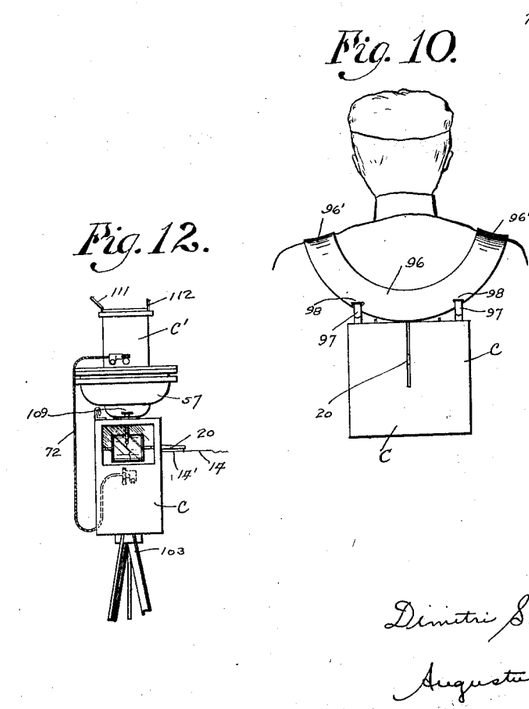
Fig. 10 is a view showing the back of the porter and looking toward the right of Fig. 9.
Fig. 12 is a side elevation of the instrument as assembled in Fig. 11.

In Figs. 9 and 10, the instrument is shown as having the casings C and C' (with the compass 57 carried by the latter) suspended from a body-harness 96, to permit the instrument to be carried by a single porter as shown, for surveying by unwinding the cable 14 during portage of the instrument, that is, with a part of the cable 14 beyond the point 14$^a$ secured to some fixed object in the field to be surveyed. Coacting parts are carried by the harness and the casing C, to permit the casing to be thus suspended, comprising hooks 97 on the casing and slots 98 on the harness. Coacting parts are carried by the harness and the casing C', to permit the casing to be also suspended from the harness, comprising forward continuations of the portions 96', both alike and one shown in side elevation in Fig. 9, terminating in hooks 99, and studs 100 for engaging the hooks, as shown best in Figs. 5 and 7, the studs being offset from an endless member 101 pivotally connected to the casing C' at 102. The studs 100 are alined, and the pivots 102 are also alined but perpendicular to the line of the two studs. Thus these parts provide means for freely suspending the casing C' and the compass 57 from the harness; as it is important to maintain the compass-card for rotation in a horizontal plane at all times.

Figure 11:
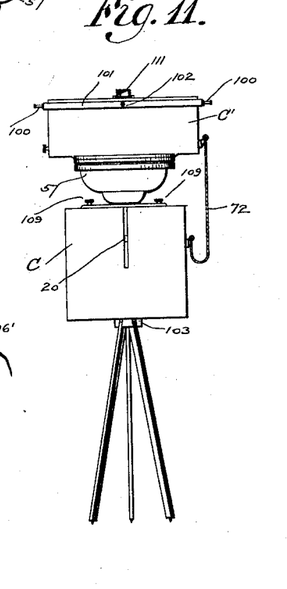
Fig. 11 is a front elevation of the instrument when arranged with the two casings in superposed relation on the tripod for surveying by unwinding the cable from the instrument when the latter is in a fixed location.

In Figs. 11 and 12 the instrument is shown as having the casing C and the casing C' (including the compass 57) superposed, to permit the instrument to be mounted in a fixed location on a tripod 103, for surveying by withdrawing the cable by pulling the cable away from the instrument. As shown most clearly in Figs. 5 and 7 the compass has secured to its bottom a plate 104 apertured at 105 and carrying a depending stud 106. As shown most clearly in Figs. 2 and 3, the top wall of casing C is provided with a socket 107, adapted to receive the centering stud 106, and is also provided with two tapped sockets 108 adapted to register with apertures 105 when the casings are arranged as shown in Figs. 11 and 12. Thumb-screws 109 are provided for thereupon clamping the parts C, 57 and C' together. In order to mount the thus integrated instrument on tripod 103, the bottom wall of casing C carries a tapped socket 110 (Figs. 2 and 3) within which may be turned the familiar threaded part of the tripod-cap.

To facilitate sighting the instrument, especially when arranged as shown in Figs. 11 and 12, it is preferred to provide on casing C', as shown best in Figs. 5, 7 and 8, a pivotally adjustable mirror 111 and a frame 112 carrying a vertical cross-hair 113.

The present paragraph, added by amendment to the specification of this application as originally filed, is so added to direct attention to my co-pending application Serial No. 406,445, disclosing and claiming not only the structural features of an improved surveying instrument of the general type hereinabove described, but also claiming more broadly than here the features common to the two constructions here and there shown, said co-pending application Serial No. 406,445 being held by me to be, at least in part, a continuation of the present application.

I claim:

1. In a surveying instrument, the combination comprising means for measuring distance traversed, means for measuring the azimuth, means for measuring the vertical angle, means for automatically making a simultaneous record of said measurements at given points of a course, and operating means for the recording means including a reel, a cable wound on the reel and adapted to have its free end attached to an object fixed in the field to be surveyed, and operative connections between the reel and the recording means; said azimuth measuring means including a compass card, and there being provided a manually rotatable card marked similarly to the compass card, with said rotatable card mounted above and for concentric rotation with the compass card, and an operative connection between said rotatable card and the recording means.

2. A surveying instrument as defined in claim 1, wherein a single index is provided for reading the markings on both cards simultaneously as intercepted by said index.

3. A surveying instrument as defined in claim 1, wherein the recording means includes a fixed stylus and a rotatable and slidable drum for carrying a record receiving element and located on a horizontal axis above the two cards and also comprises a friction wheel contacting the drum and rotatable on a horizontal axis and also comprises a device supporting said axis and itself on a vertical axis; wherein an operative connection, between the elevation measuring means and a distance measuring means, is provided to rotate the friction wheel relative to the support; wherein the direction-setting means includes a hand-actuator for rotating the support; and wherein said rotatable card is arranged between the compass card and the support, is arranged for rotation at the same rate as the support, and is of larger diameter than the support and arranged with its said markings marginally arranged and one of said markings always exposed for quick comparison with an exposed marking on the compass card at any instant opposite said marking of the rotatable card.

4. In a surveying instrument, the combination comprising true-distance measuring means, a reel, a coil of cable wound thereon and having a free end whereby the cable may be unwound from the reel to rotate the same, means operated by rotation of the reel to operate the true-distance measuring means, elevation measuring means engaged by the cable and actuated at the angle at which the cable is withdrawn from the instrument, recording means, and actuating means for the recording means controlled accurately in its operation by both the true-distance measuring means and the elevation measuring means, acting in conjunction, thereby to obtain a record of the correct datum-line distance surveyed.

5. A surveying instrument as defined in claim 4, wherein said actuating means includes a horizontal-distance measuring means operatively connected to both the true-distance measuring means and the elevation measuring means.

6. A surveying instrument as defined in claim 5, wherein said true-distance measuring means includes a rotatable member on an axis perpendicular to the arm's axis; and wherein said actuating means includes a sphere secured to said rotatable member, and a friction wheel pivotally mounted on the arm and contacting the sphere to be driven thereby in various dispositions of the arm on its axis, said friction wheel constituting the horizontal distance measuring means.

7. A surveying instrument as defined in claim 4, wherein the horizontal-distance measuring and the elevation measuring means are provided for correcting the effect of ascents and descents and obtaining true-distance measurements in correct datum-line values; said elevation measuring means including an arm pivoted on a horizontal axis passing diametrically through the equator of the sphere, the arm being interposed in the field of withdrawal of the cable whereby the arm is rocked to correspond with the angle at which the cable is unwound from the reel; there being also provided an operative connection between said last two means and the first-mentioned measuring means including a friction-wheel mounted for rotation on the arm so as to be in frictional driven engagement with the sphere during rotational movements of the arm.

8. In a cable and reel operated surveying instrument, the combination of recording means, a variable gearing operated by the withdrawal of the cable from the reel, and an operative connection between the variable gearing and the recording means, the variable gearing including two elements one operated in accordance with the true length of cable withdrawn from the reel and there being provided a movable part connected to the other element of the variable gearing and moved independent of gravity by the angle at which the cable is withdrawn from the instrument, thereby to adjust said connected element of the variable gearing so that the variable gearing operates the recording means to accurately record the correct datum-line distances surveyed.

9. A surveying instrument comprising a recording means, an operating means therefor including a reel and a cable wound thereon to be withdrawn as the instrument is transported over a course to be surveyed, and controlling means interposed between the operating means and the recording means, one of said controlling means including a compass and a manually adjustable azimuth measuring means, two supporting means on which recording, operating and controlling means are mounted, the cable and reel being mounted on one of the supporting means and the azimuth measuring means being mounted on the other supporting means, and body harness for a porter and for carrying the second supporting means.

10. A surveying instrument comprising a recording means, an operating means therefor including a reel and a cable wound thereon to be withdrawn as the instrument is transported over a course to be surveyed, and controlling means interposed between the operating means and the recording means, one of said controlling means including a compass and a manually adjustable azimuth measuring means, and two supporting means on which the recording, operating and controlling means are mounted, the cable and reel being mounted on one of the supporting means and the azimuth measuring means being mounted on the other supporting means, devices on the two supporting means whereby one of the supporting means may be mounted on a tripod or the like and the other supporting means superposed on the first, for surveying by unwinding the cable with the surveying instrument fixed, and whereby the two supporting means may be mounted on a suitable body harness for a porter for surveying by unwinding the cable during portage of the instrument.

11. In a recording surveying instrument of the cable and reel actuated type, the combination of elevation measuring means including a first rotatable member operated by the withdrawn cable predeterminedly, and independently of gravity, according to the angle at which the cable is withdrawn, true-distance measuring means operated by withdrawal of the cable, a second rotatable member rotatable by withdrawal of the cable to constitute a true-distance measuring means, horizontal-distance measuring means including a third rotatable member operated by the true-distance measuring means and the elevation measuring means acting in conjunction, the third rotatable member being always in direct operative engagement with said first and second rotatable members.

12. A recording instrument as defined in claim 9, wherein co-acting parts are carried by the harness and the second-mentioned supporting means for freely suspending a supporting means ahead of the porter's body.

13. A surveying instrument as defined in claim 4, wherein operative connections are provided between the measuring means and the recording means, said connections being entirely mechanical.

14. A surveying instrument as defined in claim 12, wherein one of said connections includes a driving member and a co-acting driven member, one of which is permanently coupled to the connection and the other of which is removable, and means for mounting the permanently coupled member so that another and different member may be substituted for the removable member to maintain the drive but pursuant to a different map-scale.

15. A surveying instrument as defined in claim 9, wherein said operating means are entirely mechanical between said controlling means and said recording means and are adapted to function similarly irrespective of the arrangement of said supporting means on the harness or on a tripod as described.

Signed at New York in the county of New York and State of New York this 2 day of January A. D. 1919.

DIMITRI SENSAUD DE LAVAUD.